United States Patent [19]

Ervin

[11] Patent Number: 5,797,637
[45] Date of Patent: Aug. 25, 1998

[54] ROLL MOVER AND METHOD OF USING

[76] Inventor: Scott P. Ervin, 984 Copella Rd., Bath, Pa. 18014

[21] Appl. No.: 803,622

[22] Filed: Feb. 21, 1997

[51] Int. Cl.⁶ .................................................. B25G 7/12
[52] U.S. Cl. ........................................ 294/17; 254/113
[58] Field of Search ................................ 294/4, 15–17; 254/15, 17, 35, 36, 38, 44, 113, 119–121, 123, 129–131

[56] References Cited

U.S. PATENT DOCUMENTS

| 256,545 | 4/1882 | Collins | 254/35 |
|---|---|---|---|
| 354,053 | 12/1886 | Franklin | 254/38 |
| 663,747 | 12/1900 | Geraghty . | |
| 800,199 | 9/1905 | Bagford . | |
| 943,013 | 12/1909 | Fichter | 254/113 |
| 1,167,660 | 1/1916 | Rolph . | |
| 1,203,889 | 11/1916 | Maliniak . | |
| 1,216,655 | 2/1917 | Campbell | 254/113 |
| 1,260,510 | 3/1918 | Carden | 254/130 |
| 1,438,818 | 12/1922 | Frantsits | 254/38 |
| 1,518,605 | 12/1924 | Sabo | 254/38 |
| 1,566,527 | 12/1925 | Dreher | 254/113 |
| 1,686,495 | 10/1928 | McDaniel . | |
| 1,781,329 | 11/1930 | Howe . | |
| 1,812,603 | 6/1931 | Meyer . | |
| 1,868,809 | 7/1932 | Rowell . | |
| 2,042,389 | 5/1936 | Compitello | 254/121 |
| 2,444,353 | 6/1948 | Kimmey . | |
| 2,553,327 | 5/1951 | Norman . | |
| 2,930,583 | 3/1960 | Noe et al. | 254/120 X |
| 3,157,411 | 11/1964 | Rhodes . | |
| 4,240,773 | 12/1980 | Terry . | |
| 4,461,458 | 7/1984 | Poulin . | |
| 4,824,313 | 4/1989 | Miller . | |
| 5,234,240 | 8/1993 | Richard . | |
| 5,253,972 | 10/1993 | Drew et al. . | |
| 5,382,131 | 1/1995 | Werthmann . | |

Primary Examiner—Johnny D. Cherry
Attorney, Agent, or Firm—Charles A. Wilkinson; Harris A. Wolin

[57] ABSTRACT

A hand operated leverage device is provided for contact with the outer surface of a roll of material, so that a relatively small amount of force applied to the device will result in a forward rotating movement of the roll of material a relatively short distance away from the user and away from the device. The support legs allow the device to be freestanding, with one of the support legs having the ability to accommodate a person's stepping force, while another support leg is pivotally connected to the body of the device and serves as a pivot point for the transmission of the force from the human operator to the roll of material. A curved, adjustable plate connected at the end of the leverage device enables it to actively engage the outer surface of the roll of material during the force-transmissive operation of the device. Operation of the device forwardly urges a roll of material away from the user and the curved plate prevents the transmitted force from damaging, marring or leaving an impression upon the outer surface of the roll of material.

19 Claims, 3 Drawing Sheets

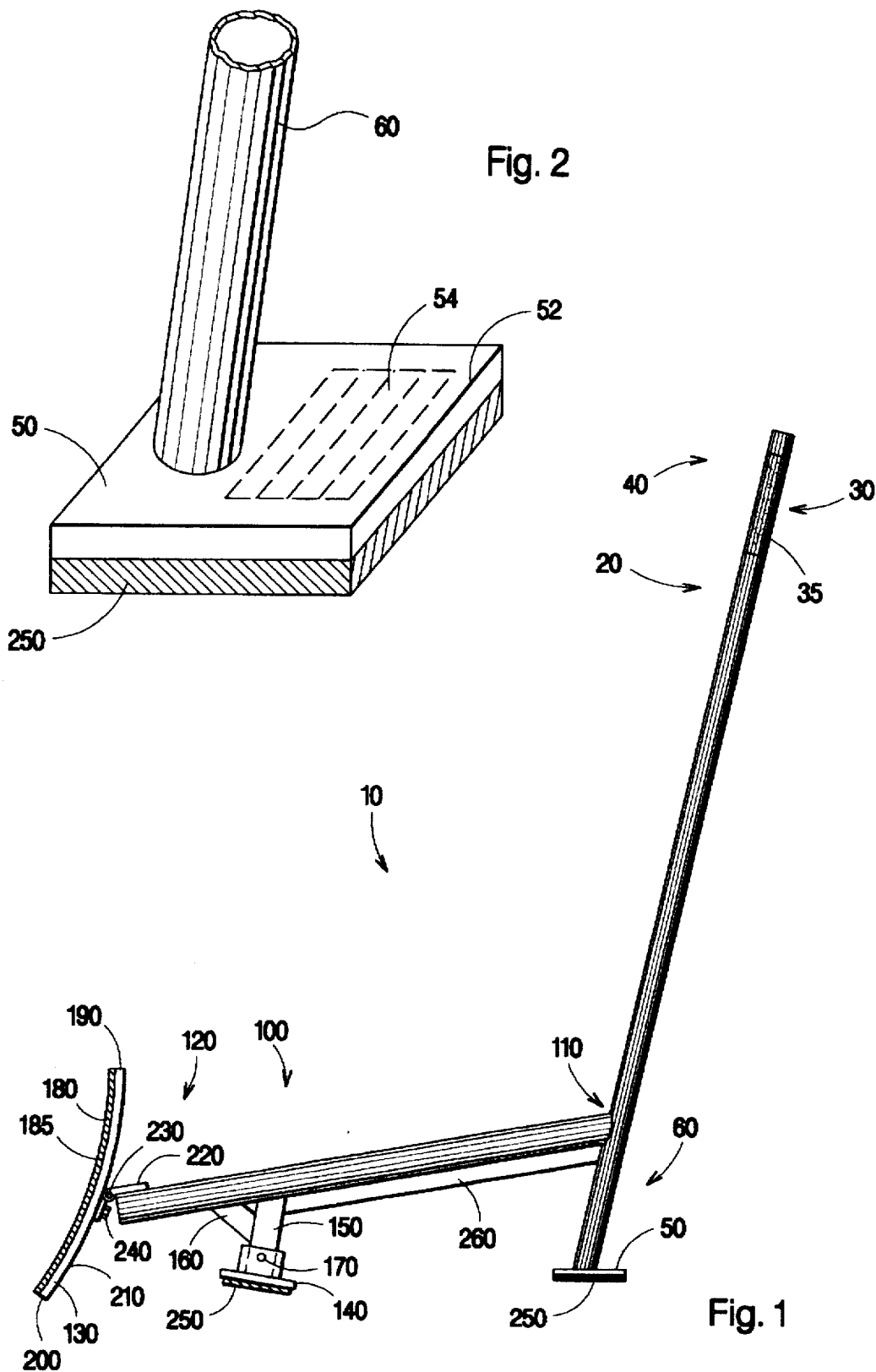

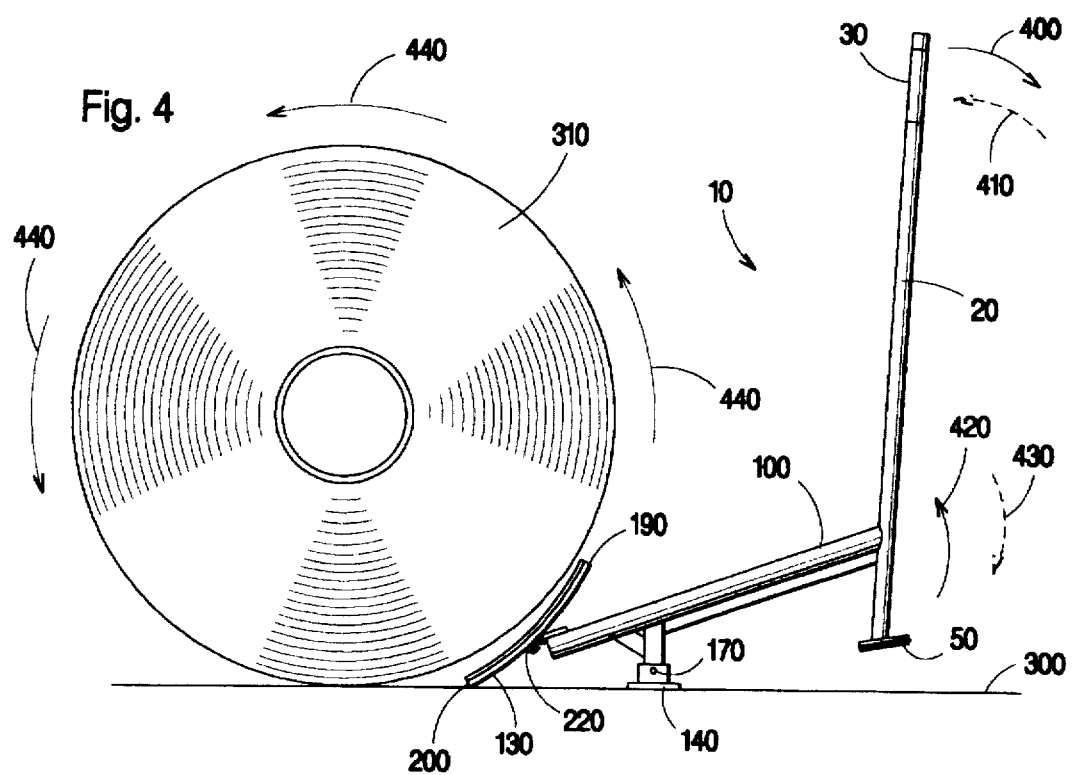
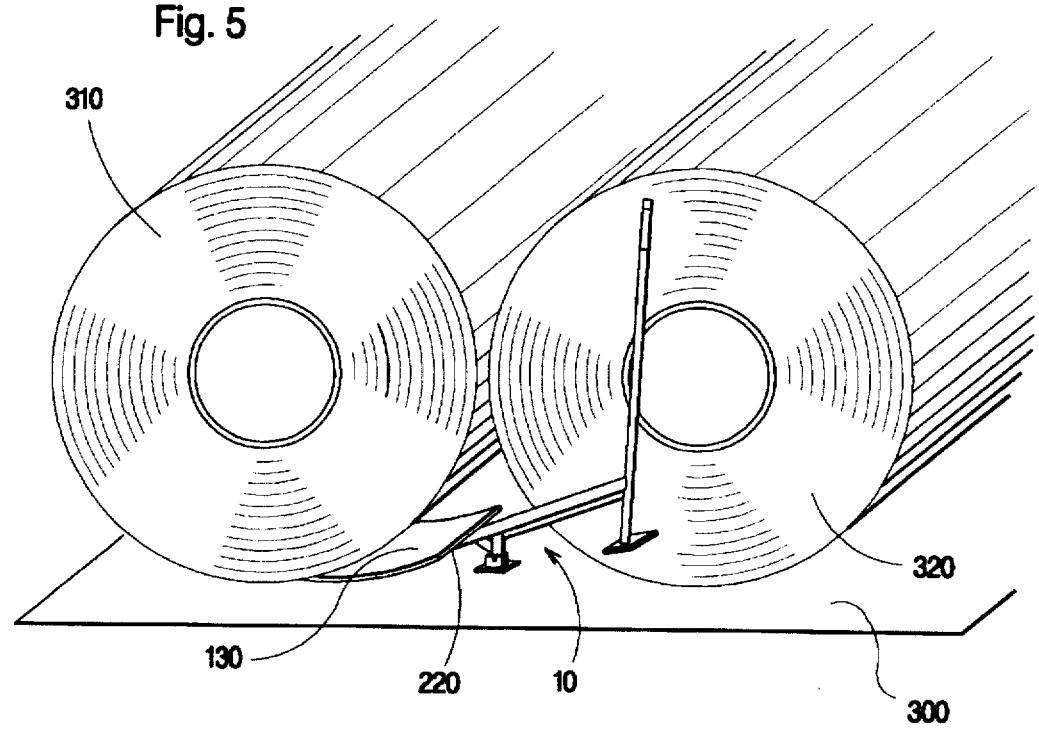

ROLL MOVER AND METHOD OF USING

BACKGROUND OF THE INVENTION

1. Field of the Invention

This invention relates generally to hand operated devices for moving large cylindrical objects, such as rolls of paper or plastic, and more particularly, to a freestanding leverage device which is placed in contact with a large cylindrical roll of material and then either urged forward toward the roll, or pulled backward away from the roll, resulting in a thrusting motion which induces the large roll forward with very little effort on the part of the person using the device.

2. Preliminary Discussion

A plant worker, when faced with the task of moving a large cylindrical object, such as, for example, a paper roll at a paper mill, has the option of doing so by hand or with the help of a machine or tool. The most common cause of worker's compensation injuries at a workplace such as a paper mill comes as the result of plant workers using their bodies to move such large rolls from one place to another. Plant workers perform these manual tasks either because the machinery is not available, or because the use of a machine is impractical when only a slight movement is desired. Also, some machines cannot accommodate rolls that are contiguously situated next to each other, since the access space for placement of a machine or the like is only available near the surface of the roll near where it contacts the floor.

The strain and physical exertion required to initiate movement of a heavy cylindrical object, and to maintain such movement, may not only be debilitating or injurious to the human body or physique, but acts or serves as a practical limitation upon the type of workers who are capable of performing such tasks; i.e., older workers and people who are less capable of manual exertion may not be utilized for this particular job. A manual force applied upon a large cylindrical object, such as a paper roll, can also damage the exterior layers of material that comprise the roll. For example, the portion of the human body that is forced against the roll may leave an impression, or cause indentations, upon the exterior layers of paper and render such exterior layers useless. It is therefore necessary that any force applied upon the outer surface of the roll be applied with great care so as to maintain the integrity of the exterior layers of roll material.

Movement of large cylindrical rolls along a horizontal planar surface has, in the past, been accomplished by several expedients including the use of rollers embedded into a factory floor to provide an integrated transport system, or by using a dolly-type lift loader by the use of which the roll is embraced and raised from the floor by the dolly and the entire dolly is moved to the roll's final destination. Roller driven mechanisms embedded within a factory floor serve, in fact or in effect, as conveyor belt mechanisms for the large cylindrical rolls, and can be potentially hazardous for a worker who mistakenly crosses the path of a heavy roll already in motion, or in the event of a malfunction by one of the conveyors. Conveyor type systems are convenient if the entire operation is mechanized, and there are very few workers on the factory floor. Dolly-type implements are limited by the amount of peripheral space around the roll in which to maneuver and operate the dolly, and are therefore impractical for rolls that are contiguously located next to other rolls.

Other roll movers take advantage of an open core extending through the roll into which opening a tool is placed to activate movement in the roll. Such type of tool is usually positioned between the inner core and the outer surface of the roll, effectively spanning the radius of such roll, and giving the user the ability to leverage movement by providing an extended radius through which the user is able to impart a tangential force. Utilizing the roll's core as a leverage position has the advantage of not being constrained by limited open space around the outer surface of the roll (as with dolly-type movers). However, the radius of the core is usually never a constant, requiring the tool to be adaptable to different surface and radii dimensions. In addition, the mechanical advantage available for effecting movement at the core of a large cylindrical role is invariably far inferior to that available for effecting movement at the outer radius of such roll, and the amount of force needed to initiate movement of a roll with a large diameter is inversely proportional to the distance away from the radial core where such force is imparted. Mobile forklift trucks and crane hooks designed to either lift a roll of material through the core or in a special cradle are frequently used to move very heavy rolls, but are time consuming and expensive to use, frequently dangerous in themselves and require considerable clearance about the roll.

The optimum type of device for imparting movement to a roll is one which places a force upon the outer surface of the roll in such a manner as not to be constrained by the location of the roll with respect to other nearby rolls, and which will not mar or damage the exterior layers of material that comprise the substance of the roll. A leverage device which effectively requires a minimal amount of force to move a relatively massive amount of material is also ideal, since it thereby avoids the strenuous physical exertion normally required to manually move a large roll of material, and allows additional plant personnel to participate in an activity for they may previously have been deemed physically unsuited. A versatile leverage-based roll mover should have the ability to effectuate movement utilizing contact with the slightest amount of exterior surface of such roll, normally just above where the roll makes contact with the floor surface, and where the fact that one roll is touching another roll is, therefore, no longer an obstacle.

The device of the present invention incorporates all of the above noted optimum features in a hand-operated tool, and overcomes the constraints of many of the prior art devices which rely upon the human force element to initiate movement. Hand-operated devices are not well represented either in the marketplace or in the prior art, and this lack of innovation has resulted in a need which is addressed by the device of the present invention which provides a hand-operated tool which is conceptually easy to visualize and therefore easy to manipulate, easy to machine or make, and otherwise easy to implement, and which also performs the required task of effortlessly moving a large cylindrical object such as a roll of paper utilizing means unrepresented in the prior art. The device of the present invention truly conforms with and illustrates the concept that simplicity is the mother of invention.

3. Description of Related Art

Leverage devices used to initiate movement of heavy, round objects appeared as early as 1900 with the invention of the "pinch bar." The old fashioned "pinch" bars, or tools used to initiate the motion of a railroad car, many of which are still in use, usually consist of an elongated handle with a sturdy angled end, the angled end being slipped underneath a railroad car wheel, after which the handle is pulled downward to force the angled end upward into the wheel thereby starting the rotation of the wheel away from the pinch bar. Use of a traditional pinch bar to effectuate movement of a large cylindrical roll of soft or impressionable material would invariably severely damage the exterior layers of material comprising the roll. The old-fashioned pinch bars, however, illustrate some of the basic leverage concepts of moving heavy circumferential objects with a longitudinal bar-type device.

U.S. Pat. No. 663,747 issued to T. Geraghty on Dec. 11, 1900, entitled "Car Starter", disclosed an angled end piece or foot rigidly connected to an elongated handle, the end or foot piece having transverse "corrugations" at the pivot points to reduce slippage where the angled end piece imparts force upon both the track and the wheel. Geraghty's pinch bar, as with many other conventional pinch bars, utilizes the track surface upon which to anchor the pivot point which distributes the force between the operator and the wheel. The device of the present invention, on the other hand, utilizes a pivotally attached supporting leg which is integrally designed or constructed into the device and serves as the pivot point or fulcrum for the force transmission between the operator of the device and the surface of a roll of material. The present invention's pivoting supporting leg not only functions as a pivot point, but it also contributes to the present invention's freestanding ability, something which is lacking in the prior art pinch bars.

U.S. Pat. No. 1,167,660 issued to C. M. Rolph on Jan. 11, 1916, entitled "Car Mover", discloses a mounting bracket which stations the pinch bar more solidly on a railroad track. This allows the tool to pivot within the bracket, thereby overcoming at least one problem of Geraghty's pinch bar.

However, Rolph's bracket arrangement is neither the same or analogous to that of the device of the present invention and is more specifically adapted to a railroad environment than the device of the present inventor.

U.S. Pat. No. 1,203,889 issued to J. Maliniak on Nov. 7, 1916, entitled "Car Starter", discloses a foot-operated device with a spring-biased fulcrum arrangement for continuous angular contact of the device with a railroad car wheel. This results in a systematic movement of the car wheel with very little preparatory realignment of the device in relation to the wheel. Maliniak's device is very specifically constructed for railroad track operation, and would not be practical for the use envisioned by the present inventor.

U.S. Pat. No. 1,781,329 issued to H. M. Howe on Mar. 21, 1928, entitled "Pinch Bar", discloses an elongated spur adjustably located within an angled bore in the rear of a pinch bar to provide an external wear/leverage point that is separate from the main body of the pinch bar. Continuous use of the pinch bar wears down the edges of the spur, without affecting the integrity of the curvature of the outer surface of the pinch bar itself, since the worn spur may be adjusted outward from within the bore to form a new leverage point. Howe's pinch bar is a basic improvement on the earlier Geraghty design.

U.S. Pat. No. 1,812,603 issued to G. Meyer on Jun. 30, 1931, entitled "Implement for Moving Railway Wagons", discloses a bearing arrangement which provides for a more fluid leverage arrangement than that of the previous references. Meyer's implement also comprises a slide with stop members which allows the entire device to travel along the track without sacrificing leverage grippability.

U.S. Pat. No. 1,868,809 issued to D. G. Rowell on Jul. 26, 1932, entitled "Car Mover", discloses a rotatably mounted thrusting pad, similar to that of the Maliniak design, in combination with a hardened pin which is used to forwardly move a railroad car wheel. The thrusting pad provides for follow-through movement of Rowell's car mover after movement has been initiated by the hardened pin at the end of the device. Again, this type of device has the same "pinch bar" shortcomings, and does not provide for the superior leverage mechanism which is critical to the design of the device of the present invention.

U.S. Pat. No. 2,553,327 issued to W. A. Norman on May 15, 1951, entitled "Roll Paddle", discloses an oar-type lever which is used to urge a large roll of material forward. Norman's description addresses a similar problem to that addressed by the device of the present invention, however, the leverage obtained from using Norman's paddle is minimal at best compared to the leverage results achieved with the present inventor's device.

Another grouping of references addresses the problem of rolling relatively unmanageable objects such as barrels and pipes, using wheels to provide the controlled movement of the object which is being rolled. U.S. Pat. No. 800,199 issued to C. E. Bagford on Sep. 26, 1905, entitled "Barrel Roller" and U.S. Pat. No. 2,444,353 issued to J. F. Kimmey on Jun. 29, 1948, entitled "Pipe Roller", disclose devices which are designed to roll a cylindrical object along a planar surface in a controlled and efficient manner. U.S. Pat. No. 1,686,495 issued to T. E. McDaniel on Oct. 2, 1928, entitled "Barrel Rolling Device", discloses a different way to position the barrel-engaging wheel, and also discloses a stopping means to retard the movement of the barrel. It is generally awkward to roll a barrel in a straight path across a floor using a hand-over-hand motion' since barrels, by their very nature, tend to roll in a wobbly fashion, and also the person rolling the barrel must maintain a steady gait while following the barrel across a floor. Neither of these aforementioned devices would be too effective on a large paper roll, for example, since they impart a normal force upon the object to be moved, which in the case of a large paper roll would have to be fairly t substantial. These barrel roller devices would require the same manual exertion, and would affect the same upper body and back muscles as though a person were moving the rolls using only their bodies. Therefore, it would be essentially self defeating to use these types of devices on a massive size cylindrical object.

There are some leverage devices in the prior art which may be considered "analogous", or similar in certain ways, to the leverage aspects of the mover device of the present invention, although these devices were not designed or dedicated to moving large cylindrical objects such as rolls of paper. U.S. Pat. No. 3,157,411 issued to J. D. Rhodes on Nov. 17, 1964, entitled "Lever Dolly", discloses a rolling lift device which is essentially a swivelling pry bar designed primarily for lifting followed by pulling or pushing movement. U.S. Pat. No. 4,461,458 issued to C. Poulin on Jul. 24, 1984 entitled "Low Effort Digging and Lifting Tool", discloses a shovel supported by a lever arrangement, and is narrowly tailored to its disclosed use. U.S. Pat. No. 5,382,131 issued to P. E. Werthmann on Jan. 17, 1995, entitled "Tool for Manipulating Heavy Objects", discloses a leverage assembly with an elongated clamp assembly for the manual lifting, transport, and positioning of heavy objects. Werthmann's disclosure is fairly specifically drawn to a carriage device, and not broadly to a leverage device, which further illustrates his fairly narrow conceptual base. Each of these references discloses a leverage arrangement which is not unique to the prior art. The leverage arrangement of the device of the present invention, however, discloses a dual support structure embodying a freestanding pivot system which utilizes the force contributed by both the operator's hands and feet, and is therefore unrepresented within the prior art.

Finally, there are prior art references dedicated to the movement of large cylindrical objects, such as rolls of paper, which would probably be considered the most analogous to that of the present invention, since they are designed for the specific purpose of moving large roll-type objects.

U.S. Pat. No. 4,240,773 issued to M. D. Terry on Dec. 23, 1980, entitled "Roll Handling Apparatus", discloses the use of air bearings within a dolly-type framework to assist in the movement of a large roll object. U.S. Pat. No. 5,253,972 issued to W. Drew et al. on Oct. 19, 1993, entitled "Roll Dolly", discloses a pallet jack for moving a large paper roll, which appears to be an improvement over Terry's roll handling apparatus. However, like Terry's device, Drew's device is complicated and suffers from many of the constraints previously discussed relating to dolly-type apparatus.

U.S. Pat. No. 4,824,313 issued to M. Miller on Apr. 25, 1989, entitled "Device for Lifting and Moving Carpet Rolls", discloses a core-based leveraged lifter in combination with a moveable dolly which is designed for the transport of large cylindrical objects. Miller's device involves two-person operation and addresses the lifting and subsequent transport of a carpet roll. The device of the present invention is concerned primarily with the initiation of movement of a large cylindrical roll using a leverage mechanism unrepresented in the prior art, and does not address concerns dealing with long distance transport.

U.S. Pat. No. 5,234,240 issued to M. Richard on Aug. 10, 1993, entitled "Stratified Roll Positioning Apparatus", discloses a manual tool for rolling and positioning a large cylindrical roll of material. An articulated bar assembly is inserted into the roll's core and extends along the side of the roll, along the roll's radius, to the outside surface of the roll. A lever handle with a cleat member, rotatably connected to the articulated bar assembly, is then applied to the outer surface of the roll thereby causing the roll to move. The cleat member is then released and the lever handle is repositioned along the outer surface of the roll for repeated engagement of the cleat member with the outer surface of the roll, which in turn provides additional rotation upon the outer surface of the roll. Repeated implementation of Richard's apparatus allows the tool to be operated in a ratcheting manner as described more fully in the body of the reference. Richard's tool accomplishes a similar function as the device of the present invention, however, the leverage systems are completely different. An operator of Richard's tool must follow the movement of the roll and must release the tool before it becomes inaccessible, and successive ratcheting-type movement becomes awkward for large sized rolls, and the actual movement of Richard's device stresses the same muscles that would be used for manual movement absent the aid of any type of device. In addition, the advantage gained by Richard's device in terms of increased leverage is minimal compared to that of the device of the present invention since Richard's tool is in essence a slight extension of the radius of the roll.

None of the prior art devices embody the unique construction and characteristics of the device of the present invention. More particularly, none of the prior art devices are freestanding, none have the leverage capability provided through the use of a dual ground-support structure, and none provide the ability to utilize the contributions of the operator's arm strength as well as the operator's leg strength in effecting the resultant movement. The prior art references do not address the concerns attributable to the proper maintenance of the exterior layers of roll material when a force is imparted upon such exterior surface, and the device of the present invention is specifically designed to alleviate this potential problem. The device of the present invention is specifically designed to fulfill the need created by the deficiency in the prior art.

OBJECTS OF THE INVENTION

It is an object of the present invention, therefore, to provide a freestanding, hand-operated device which, when actively applied to the exterior surface of a large roll of material, causes movement of such roll of material with relatively little effort by the individual operating the device of the invention.

It is a further object of the present invention to provide a roll-moving device which is freestanding through the use of a plurality of support legs.

It is a still further object of the present invention to provide a roll-moving device which incorporates a plurality of support legs, one of the legs additionally forming a pivot connection for the transmission of the force from the operator of the device to the roll of material, while another leg additionally comprises a foot pedal surface which allows the operator of the device to use his or her legs to contribute to the transmissive force upon the roll of material.

It is a still further object of the present invention to provide a roll-moving device which contacts the outer surface of a roll of material in a non-intrusive manner, such that the integrity of the outer surface of the roll of material remains unaffected when a force is transmitted from the device of the invention to the outer surface of the roll of material.

It is a still further object of the present invention to provide a roll-moving device with an adjustable plate that unintrusively contacts the outer surface of a roll of material and is adjustably mounted to a lever arm of the device of the invention to provide for follow-through motion of the adjustable plate upon the outer surface of the roll of material as the roll of material is urged forwardly.

It is a still further object of the present invention to provide a roll-moving device with an adjustable contact plate for placement of the device of the invention at an angle other than directly in front of the outer surface of the roll.

It is a still further object of the present invention to provide a roll-moving device with a curved adjustable plate that is dimensioned to receive an arcuate portion of the outer surface of a large roll of material.

It is a still further object of the present invention to provide a roll-moving device that is frictionally grounded during its operation.

It is a still further object of the present invention to provide a roll-moving device which is easily constructed from lightweight and sturdy materials such that operation of the device becomes relatively effortless for users of all strengths and body types.

It is a still further object of the present invention to provide a roll-moving device which is easily transportable and easily stored for convenient placement during times of nonuse.

Still other objects and advantages of the invention will become clear upon review of the following detailed description in conjunction with the appended drawings.

SUMMARY OF THE INVENTION

The device of the present invention consists of a leverage mechanism, preferably in the shape of a "lazy-L", consisting of a gripping end for human maneuvering at the upper end of the "L" and an engaging end for contact with the surface of a roll of material at the lower end of the "L", which is used to forwardly urge a large roll of material a relatively short distance with a relatively small amount of applied force upon the device. A plurality of support legs allow the device to be freestanding, with one of the support legs having a surface to accommodate a person's stepping force, while another support leg is pivotally connected to the body of the device of the invention and serves as the pivot point for the transmission of force from the human operator to a roll of material. A heavy-duty, hingedly connected, curved plate is adjustably attached to the engaging end of the device of the invention, and is used to actively engage the outer surface of the roll of material during operation of the device. Such plate prevents the transmitted force from damaging, marring or leaving an impression upon the outer surface of the roll of material during operation of the roll moving device.

The device of the invention is placed adjacent the outer surface of the roll and the gripping end of the lever member is pivoted toward the roll on the pivoting leg thereby lowering the curved plate into contact position with the outer surface of the roll just slightly above the junction where the floor meets the outer surface of the roll. The gripping end of the lever member is then either pushed forwardly toward the roll, or is pulled or pushed backwardly and/or downwardly away from the roll, and the force is transmitted to the curved plate of the engaging end into the roll of material, thereby urging the roll of material forward and away from the operator. At the same time the operator thrusts the gripping end of the lever member backward or downward, the operator may also employ his or her leg strength by stepping upon the upper surface of the other supporting leg to further impress the overall movement of the device upon the roll.

The curved plate adjusts its position on the engaging end to of the lever member maintain constant and consistent contact with the outer surface of the roll thereby following the movement of the roll as it rotates away. The ability of the curved plate to follow or adjust to the surface orientation of the roll diminishes the potential for an edge of the curved plate to mar, damage or leave an impression upon the exterior layers of the roll material.

After the operator of the device engages in a single thrusting movement, the operator merely has to reposition the pivotal leg and the curved plate of the device of the invention in preparation for another thrust if desired. The curved plate is hinged upon the device to accommodate situations where placement of the device directly in front of the roll becomes impossible, and placement of the curved plate is accomplished directly adjacent an outer edge of the roll and still results in effective force transmission even though the leverage member is adjacently displaced from the outer surface of the roll. The versatility of the device of the invention is embodied within the adjustable nature of the surface contact plate and its ability to effectively transmit the force from the leverage device to the roll surface while the leverage device is adjacently displaced from the outer surface of the roll. The unique leverage support structure, and the effortless thrusting resulting from the combined force from the user's arms and legs upon the device during its operation makes the device of the invention an ideal tool for the manipulation of large rolls of material.

BRIEF DESCRIPTION OF THE DRAWINGS

FIG. 1 is a side elevation of the roll mover device of the invention.

FIG. 2 is an isometric view of the first foot pad section of the roll mover device of the invention.

FIG. 4 is a side view, diagrammatic illustration of the device of the invention in operation against a roll of material with arrows indicating movement of the roll mover device of the invention and movement of the roll of material.

FIG. 5 is a partial isometric illustration of the roll mover device of the invention where the roll mover device is located adjacent a roll of material as opposed to being placed directly in front of such roll of material as depicted in FIG. 4.

DESCRIPTION OF THE PREFERRED EMBODIMENTS

Figure 3:
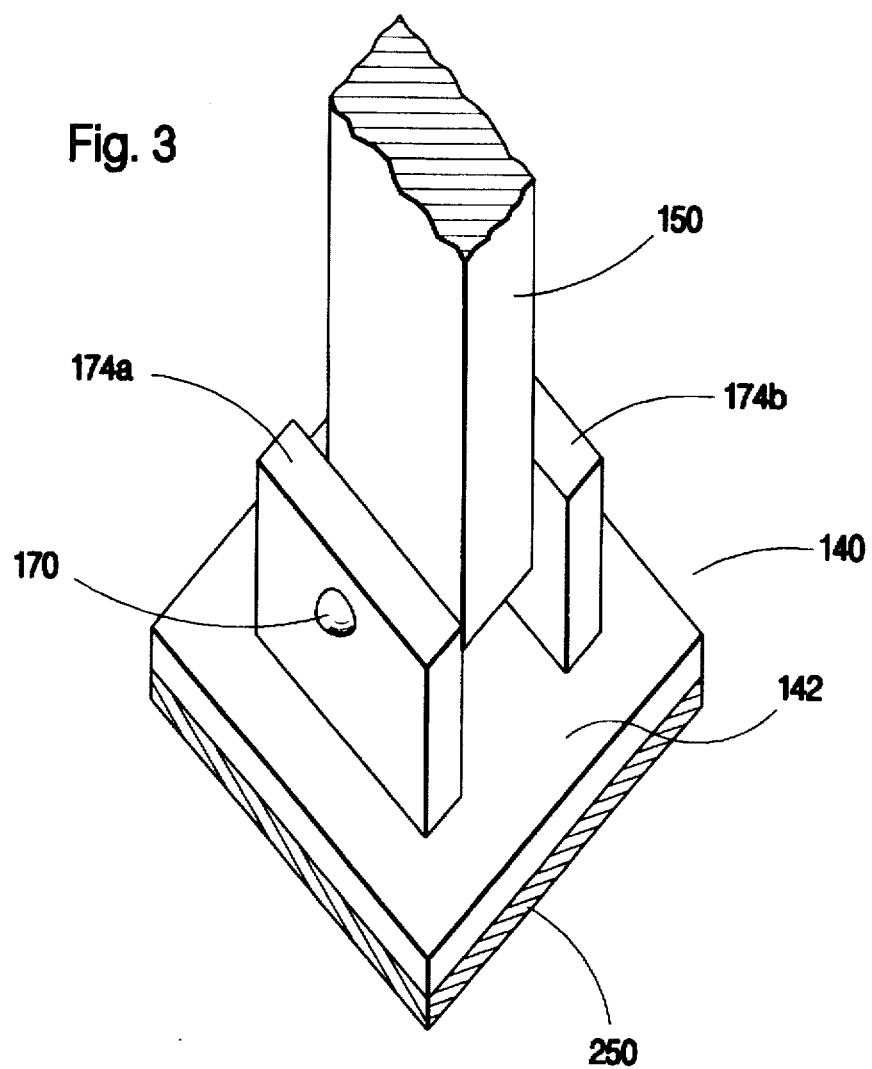
FIG. 3 is an isometric view of the second foot pad go section of the roll mover device of the invention.

The hand operated roll mover of the invention is a significant departure from conventional hand operated roll movers, and more particularly, as such devices relate to paper roll movers. The leverage obtained from the unique arrangement of support legs, and a distinctive curved, surface-engaging adjustable plate for the transmission of the moving force from the device of the invention to the roll that is to be moved, comprise characteristic elements unrepresented within the prior art roll movers. It will be evident to one skilled in the art that the roll mover of the invention may be employed on not only large rolls of paper, but on plastic rolls, carpet rolls and the like. Although the present inventor conceived of his roll mover in connection with large cylindrical rolls, it will be understood, and it will also be evident to one skilled in the art that the present invention may be employed on any dimensional round or cylindrical object such as, for example, a barrel, beer keg, a large utility pipe, and the like. Constructed particularly sturdily, it may also be used in the movement of heavy coils of steel strips or other metal coils or steel rolls or the like.

The device of the present invention is essentially an angled lever member with preferably two support legs. Each leg serves a dual function, with the first function being to maintain the freestanding capability of the device during times when the device is either stored away or currently not in active use. The angled nature of the body of the leverage member results in a preferred arrangement of two legs, one at the rear of the device situated along the same plane as the gripping component of the lever member to support the weight of the gripping component of the lever member, and another near the engaging end of the leverage member to provide the pivot point necessary to the fulcrum motion of the invention.

A supporting pad located at the lower terminus of the rear leg of the invention is dimensioned to receive an individual's foot for when such individual chooses to forcefully step upon the pad to facilitate movement of the entire leverage member in connection with the individual's hand-initiated thrust upon the gripping end of the leverage member. Thus, the individual may impart a force upon the device of the invention, and thus upon the roll of material, using merely his or her hands and arms, or may contribute to such force with his or her feet and legs. An operator's ability to distribute the thrusting force between his or her arms and legs is a highly attractive feature of the present invention since it alleviates the stress and strain usually imparted upon only a singular group of muscles. Force may also be applied to the roll material by moving the gripping end of the leverage handle member either rearwardly or downwardly or forwardly or upwardly, further increasing the versatility and allowing the user to adopt consecutive alternative applications of force to the roll of material.

The leg near the engaging end of the leverage member serves to both support the device and create the pivot point for the transmission of the thrust force between the leverage member and the roll of material. An adjustable curved plate is hinged to the engaging end of the leverage member near the pivoting leg to contact the outer surface of the roll of material. The slight curvature of the plate is such that it is dimensioned to receive relatively large rolls of material, and is easily modified in accordance with the particular roll radius by substituting plates with alternative radii of curvature. The adjustability of the plate's hinge connection allows the plate to be positioned at different orientations and with different configurations, so that the device may be placed either directly in front of the roll or directly adjacent the roll. This adjustability allows the device to be employed from the side of the roll when there is no place to situate the device directly in front of the roll, such as when two rolls are located directly next to each other. The freedom to use the device of the invention in a variety of locations while maintaining the superior leverage characteristics embodied within the unique construction or combination of elements, makes the device of the invention commercially attractive as well as highly desirable in its respective fields of use.

The following detailed description is of the best mode or modes of carrying out or construction of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

FIG. 1 is a side elevation of the roll mover device of the invention 10. A first lever member 20 is comprised of an elongated handle member 30, preferably equipped with a comfortable grip 35, at the upper gripping end 40 of the first lever member 20, and a first foot pad 50 at the lower stabilizing end 60 of the first lever member 20. A second lever member 100 extends outward at intersection 110 from the first lever member 20, and terminates at the engaging end 120 of the second lever member 100 with a curved plate 130, which plate 130 is dimensioned to receive the outer surface of a large roll of material (shown in FIG. 4). A second foot pad 140 is situated near the engaging end 120 of the second lever member 100, and is pivotally connected to the second lever member 100 via a leg 150, preferably an angle support 160, and pivot connection 170. The curved plate 130 has a roll engaging outer surface 180, an upper edge 190, a lower edge 200 and a rear surface 210. The outer surface 180 of the plate 130 may comprise an additional compressible layer of material 185 for enhanced contact between the plate 130 and the outer surface of a roll of material (not shown). A hinge 220 is fastenably secured to the second lever member 100, and joins the second lever member 100 to the curved plate 130 in an angularly adjustable arrangement via a standard hinge pin connection 230, with the other end of the hinge 220 being securely connected to the rear surface 210 of the curved plate 130 with locknuts 240. Friction reducing, non-slip pads 250 are adhered to the bottom of each foot pad 50 and 140 to provide greater cohesion between the device of the invention 10 and the supporting planar surface (floor) and to further stabilize the device of the invention 10 during its operation. A bracing longitudinal gusset 260 is preferably provided along the bottom of the second lever member 100 between the junction 110 of the first and second lever members and the leg 150 of the second foot pad 140 to enhance the force distribution and support along the second lever member 100.

Figure 2A:
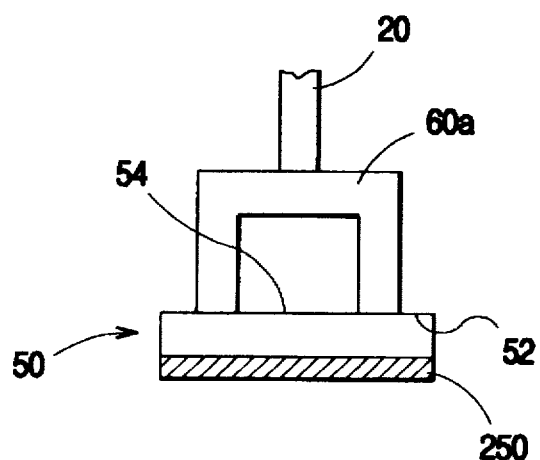
FIGS. 2A and 2B are rear views of alternative embodiments of the first foot pad section of the invention showing a stirrup configuration with different cross sectional geometries.
Figure 2B:
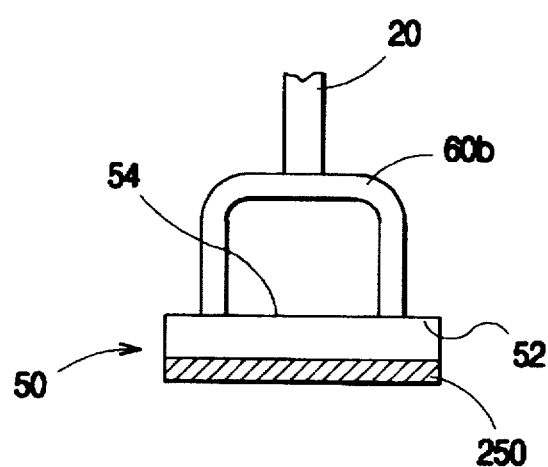

FIG. 2 is an isometric view of the first foot pad 50 and the lower section 60 of the first lever member 20. It is preferable that both first and second lever members, 20 and 100 respectively, have a round cross section as shown, although it will be understood that a variety of cross sectional lever members will be operable. The present inventor has found that first and second lever members 20 and 100, constructed out of 0.065 inch tubing or piping with an outer diameter of 1¼ inches, is sufficient to operate upon and move a 5000 pound roll of paper. One skilled in the art will undoubtedly realize that these structural dimensions may be varied according to the character of the roll of material. The first lever member 20 is also preferably located at an angle from the horizontal, as shown in FIG. 1 and as will be further illustrated in FIG. 4, to allow for an operator to easily grasp the handle member 30 when the device of the invention 10 is pivoted toward a roll of material in preparation for the operator's thrust. If the first lever member 20 were situated perpendicular to the first foot pad 50, then the handle member 30 would be difficult to grasp when the device of the invention 10 was pivoted forward (pivoting on the second foot pad 140 as shown more particularly in FIG. 4) and placed in preparation for operation. As is more fully illustrated in FIG. 4, an angled relationship between the first lever member 20 and the horizontal defined by the first foot pad 50 results in an easily graspable handle member 30 when the device of the invention 10 is pivoted forward in preparation for force transmissive operation, and the pivoting forward of the device of the invention 10 compensates for the obtuse angle between the first and second lever members 20 and 100 and, therefore, the first lever member 20 will appear to be substantially vertically situated with respect to the floor and with respect to an operator about to grasp upon the handle member 30 of the invention 10. If the angle between the first and second lever members 20 and 100 were acute to 90°, the pivoting forward of the device of the invention 10 would tend to pivot the handle member 30 away from the operator to an almost ungraspable extent where it would become awkward to effectively and efficiently operate the device of the invention 10 from one position on the floor. In other words, an operator would have to take a step forward to grasp the handle member 30 and then would have to almost walk backward during the thrusting operation in order to obtain the most leverage from the standing position. FIG. 2 also illustrates a foot receiving surface 54 located near the outermost edge 52 of the first foot pad 50, which foot receiving surface 54 is achieved by connecting the lower section 60 of the first lever member 20 away from the outermost edge 52 of the first foot pad 50 just slightly off center. It will be understood that the foot receiving surface 54 does not have to be dimensioned to receive the entire foot of an average human, but must merely accommodate that frontal portion of the foot used to impart an additional stepping force upon the first foot pad 50 during the thrusting operation. The foot receiving surface 54 may contain an additionally adhered friction reducing surface (shown by the dotted lines) to enhance the gripping relation between the operator's foot and the first foot pad 50 as the operator steps downwardly upon the first foot pad 50. Implementation of the foot receiving surface 54 by the operator is optional, considering that the primary thrust is provided by the operator upon the gripping member 30 of the first lever member 20, and the operator may enhance this arm-induced thrust by concurrently stepping upon the foot receiving surface 54 of the first foot pad 50. On the other hand, if the operator chooses to thrust forwardly upon the gripping end 30, in which case stepping upon the foot receiving surface 54 would become counterproductive, then the operator may choose to impart an upward force upon either the outermost edge 52 or upon the underside of the friction reducing pad 250 of the first foot pad 50 to facilitate the arm-induced forward thrust. FIGS. 2A and 2B are rear views of an alternative embodiment of the lower section 60 of the first lever member 20 showing a stirrup-type configuration for placement of an operator's foot during operation of the device of the invention. In addition to the foot receiving surface 54 on each alternative embodiment, the lower section 60a of the first lever member 20 of FIG. 2A provides a stirrup-like opening with a straight-edge (rectangular) cross section dimensioned to receive an operator's foot, while FIG. 2B illustrates a lower section 60b embodying a rounded cross section as shown. The stirrup-type embodiments 60a and 60b provide an enhanced, encompassing configurational relationship between the operator's foot (not shown) and the first foot pad 50 should the foot receiving surface 54 be deemed insufficient to maintain a particular operator's foot (not shown) on the first foot pad 50. One skilled in the art will understand that many geometrical cross sections are possible in addition to the straight-edge 60a and rounded 60b as shown.

FIG. 3 is an isometric view of the second foot pad 140 with a lower section of the leg 150 shown for illustration. The pivot connection 170, which is supported between opposing pairs of upwardly extending bracket members 174a and 174b, extends through the lower section of the leg 150 and is preferably comprised of a locknut 170, although it could also comprise any type of pin connection forming an overall clevis arrangement between the bracket members 174a and 174b and the leg 150. The non-slip pad 250 serves an identical function as the non-stick pad 250 previously described in connection with the first foot pad 50. The rectangular cross sections of the leg 150 and bracket members 174a and 174b shown in FIG. 3 are may also be round, or circular, depending on the type of material used to construct the leg 150 and bracket members 174a and 174b, and therefore the square figures comprising the components of FIG. 3 are not meant to be limiting in any respect. The leg 150 rotates by way of the pivot connection 170 and the bracket members 174a and 174b by way of the leg 150 being raised from the upper surface 142 of the second foot pad 140 as shown. Therefore, during operation of the device of the invention 10, the entire device rotates about the pivot connection 170 while the second foot pad 140 maintains gripping contact with the ground (not shown) via the non-slip pad 250.

FIG. 4 shows the device of the invention 10 in preparation for operation, with arrows indicating movement in response to a forceful thrust upon the device of the invention 10 resulting in movement of the roll 310. The device of the invention 10 is shown in typical preparation for operation, the first and second lever members 20 and 100 rotated toward the roll 310 pivoting on the second foot pad 140 as shown, the first lever member 20 positioned substantially vertically and substantially perpendicular to the ground 300, and the curved plate 130 positioned into surface contact with the outer surface of the roll of material 310. The solid arrows 400 and 420 in connection with the device of the invention 10 indicate a thrusting movement downward or toward the operator (not shown), and more particularly, the arrow 400 indicating the operator's hand-engaging thrust upon the gripping end 30 of the first lever member 20 and the arrow 420 indicating the operator's foot-engaging thrust upon the first foot pad 50 (previously mentioned in connection with FIGS. 2, 2A and 2B). The dotted arrows 410 and 430 in connection with the device of the invention 10 indicate a thrusting movement forward or away from the operator (not shown), and more particularly, the arrow 410 indicating the operator's hand-engaging thrust upon the gripping end 30 of the first lever member 20 and the arrow 430 indicating the operator's upward foot-engaging thrust upon the first foot pad 50 (also previously mentioned in connection with FIGS. 2, 2A and 2B). Either the downward thrust, illustrated by arrows 400 and 420, or the upward thrust, illustrated by arrows 410 and 430, result in a forwardly upward movement of the plate 130 against the roll of material 310 thereby resulting in movement counterclockwise, as viewed in FIG. 4, of the roll of material 310 away from the operator (not shown) and away from the device of the invention 10 as shown by arrows 440 about the roll 310. Forwardly thrusting upon the handle member 30 of the first lever member 20, illustrated by arrow 410, will result in a greater forward component of force distributed through the curved plate 130, while downwardly thrusting upon the handle member 30 of the first lever member 20, illustrated by arrow 400, will result in a greater upward (tangential) component of force distributed through the curved plate 130 and will tend to result in an easier "roll" of the actual roll of material 310 away from the operator (not shown). A downward thrust upon the handle member 30 is preferred over a forward thrust upon the handle member 30 because the downward thrust upon the handle member 30 may be easily combined with a downward thrust upon the first foot pad 50 as described in connection with FIGS. 2, 2A and 2B. A downward thrust upon the handle member 30 will also result in a substantially, tangentially applied force upon the surface of the roll 310 which is more effective than what would occur with a forward thrust upon the handle member 30 which would tend to impart more of a normal force upon the surface of the roll 310 in conjunction with a not-as-substantial tangential force. The hinge connection 220 allows the curved plate 130 to maintain contact with the surface of the roll of material 310 as the device of the invention 10 is pivoted forwardly or downwardly about the pivot connection 170. The versatility exhibited by the curved plate 130 in maintaining continuous contact with the outer surface of the roll 310 prevents injurious contact between the edges 190 and 200 of the curved plate 130 and the outer surface of the roll 310 and thereby prevents injury to the outer layers of material comprising the roll 310. After a thrust is imparted upon the device of the invention 10 and the roll 310 is urged forwardly away from the operator and away from the device 10, the operator, if additional forward movement is desired, merely has to grasp the handle member 30 of the first lever member 20, lift the device 10 off the floor 300, and reposition the device 10 in relation to the roll of material 310 in preparation for another forceful thrust.

The length of the second lever member 100 is somewhat determinative of the diameter of the roll 310 which the device of the invention 10 may accommodate. The present inventor has found that a roll diameter of two to three times the length of the second lever member 100 will result in an effective operation of the device of the invention 10. Therefore, for example, a second lever member 100 that is nineteen inches long may effectively accommodate a roll of material 310 with a diameter of between thirty-eight to fifty-seven inches. The present inventor has also found that a two-to-one relationship between the lengths of the first and second lever members respectively will also result in an effective fulcruming operation of the device of the invention, with these dimensions being variable depending upon the strength of the material of construction and the amount of resultant torque desired.

FIG. 5 is an isometric view illustrating operation of the device of the invention 10 upon a roll of material 310, where such roll 310 is adjacent another roll 320 such that direct access in front of the roll 310, as illustrated in connection with FIG. 4, in not possible. The versatility of the hinge connection 220 (also see FIG. 1) of the curved plate 130 allows the curved plate 130 of the device of the invention 10 to operate effectively upon a roll of material 310 while such device 10 is positioned adjacent to the roll of material 310 as shown. Effective leverage upon the roll of material is not sacrificed by positioning the device of the invention 10 adjacent the roll 310, although, for obvious reasons, the mechanical impact of the leverage force places less of a strain upon the hinge connection 220 when the device 10 is situated directly in front of the outer surface of the roll 310 as in FIG. 4.

Operation of the device of the invention 10 has been described with particularity in connection with the detailed description of the appended figures. The device 10 is preferably constructed from strong, relatively lightweight materials so that any operator may, with relative ease, move or transport the device 10 while grasping only the handle member 30. The reinforcing angle member 160 (see FIG. 1) and gusset 260 provide additional leveraging strength during fulcrum movement of the device 10 about the pivot connection 170 embodied within the second foot pad 140. The device of the present invention is not designed to move a large roll of material forward a great distance, but rather is implemented to effectuate short spurts of movement which would normally be accomplished by hand and without the assistance of a tool or a machine. The device of the invention 10, however, may be modified to effectuate a greater forward movement by enhancing the lever member dimensions which would result in a greater amount of torque and force applied to the roll of material.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A leverage device for moving a large roll of material comprising:
   a. an elongated, rigid, handle member having a first gripping end and a second stabilizing end,
   b. the second stabilizing end of the handle member terminating in a first foot pad fastenably connected to the handle member,
   c. a rigid force distributing member secured to and extending at an angle away from the second end of the handle member and displaced from the first foot pad,
   d. a second foot pad connected to the force distributing member displaced from the first foot pad, the second foot pad being connected to the force distributing member via an angle member for increased stability,
   e. the second foot pad being rotatably connected to the angle member so that the second foot pad acts as a fulcrum member remaining in continuous contact with the floor during the operation of the leverage device, and
   f. a curved plate, hingedly mounted to the end of the force distributing member away from the handle member, adapted to contact the outer surface of a roll of material and urge the roll forward without marring the outer surface of the roll.

2. A leverage device for moving a large cylindrical roll of material in accordance with claim 1 wherein the first and second foot pads are equipped with non-slip, friction reducing bottom surfaces.

3. A leverage device for moving a large cylindrical roll of material in accordance with claim 2 wherein the surface of the curved plate is equipped with a non-slip, friction reducing surface.

4. A leverage device for moving a large roll of material in accordance with claim 3 wherein the first foot pad is dimensioned to receive a person's foot in order that an individual can operate the device by concurrently imparting a force both upon the handle member and the first foot pad.

5. A leverage device for moving a large roll of material in accordance with claim 4 wherein the curved plate is capable of assuming a variety of angular positions such that the leverage device can be applied to a roll of material from outside the path of the roll, and does not have to be directly in front of, or behind, the roll in order to use the device.

6. A leverage device for moving a large roll of material in accordance with claim 5 wherein the curved plate is adjustable to accommodate rolls of different sizes and weights.

7. A method of using an angled leverage device for moving a large roll of material situated on a planar surface comprising:
   a. placing an angled leverage device comprised of:
      (i) a handle member having a hand contact portion adjacent one end,
      (ii) a force distributing bar at an obtuse angle to the handle member and attached to the end of the handle member adjacent to but spaced from the end opposite the end adjacent the hand contact portion,
      (iii) a first support member opposite the hand contact portion of the handle member,
      (iv) a second support member displaced from the first support member along the force distributing bar, and
      (v) an adjustable plate on the end of the force distributing bar away from the handle member,
   on the planar surface and adjacent a roll of material,
   b. gripping the hand contact portion of the handle member and rotating the handle member and first support member toward the roll of material pivoting on the second support member,
   c. maneuvering the adjustable plate alongside the planar surface and in contact with the outer surface of the roll of material, and
   d. thrusting on the handle member, thereby rotating the angled leverage device about the second support member and imparting a force upon the outer surface of the roll of material which urges the roll of material away from the angled leverage device and the user.

8. A method of using an angled leverage device for moving a large roll of material situated on a planar surface in accordance with claim 7 wherein the initial placement of the angled leverage device is directly behind the roll of material.

9. A method of using an angled leverage device for moving a large roll of material situated on a planar surface in accordance with claim 7 wherein the initial placement of the angled leverage device is slightly angularly adjacent the roll of material.

10. A method of using an angled leverage device for moving a large roll of material situated on a planar surface in accordance with claim 7 wherein the handle member is thrust upward.

11. A method of using an angled leverage device for moving a large roll of material situated on a planar surface in accordance with claim 7 wherein the handle member is pulled upon.

12. A method of using an angled leverage device for moving a large roll of material situated on a planar surface in accordance with claim 7 wherein the thrusting on the handle member is accompanied by stepping on the first support member to aid in the movement of the angled leverage device.

13. A leverage providing device for moving a roll of material across a substantially level surface comprising:

a. an elongated handle member, b. an elongated force distributing member secured to the elongated handle member adjacent one end, c. a first support member secured to the force distributing member adjacent the connection therewith of the elongated handle member and extending generally downwardly therefrom and adapted for remaining in discontinuous contact with the substantially level surface during the operation of the leverage providing device, d. a second support member secured to the force distributing member displaced from the first support member and extending generally downwardly from the force distributing member and adapted for acting as a fulcrum member remaining in continuous contact with the substantially level surface during the operation of the leverage providing device, and e. an adjustable plate secured to the end of the force distributing member away from the elongated handle member.

14. A leverage providing device in accordance with claim 13 wherein the adjustable plate is universally, hingedly adjustable.

15. A leverage providing device in accordance with claim 14 wherein the first and second support members have transversely extended lower surfaces dimensioned for supporting the leverage providing device with the elongated handle member extending upwardly.

16. A leverage providing device in accordance with claim 15 wherein the transversely extended surface of the first support member has a transversely extended upper surface adapted for contact with a foot of a user.

17. A leverage providing device in accordance with claim 16 wherein the transversely extended upper surface adapted for foot contact extends to the side of the handle member and the force distributing bar.

18. A leverage providing device in accordance with claim 16 wherein the first support member is in the nature of a stirrup configuration dimensioned to receive a foot of a user.

19. A leverage providing device in accordance with claim 16 wherein the adjustable plate is hingedly adjustable on the end of the elongated force distributing member to accommodate rolls of material of different sizes at various contact angles.

* * * * *